United States Patent [19]
Helphrey

[11] Patent Number: 4,603,659
[45] Date of Patent: Aug. 5, 1986

[54] ADJUSTABLE MUZZLE

[76] Inventor: Marvin G. Helphrey, 3647 Avocado Blvd., La Mesa, Calif. 92041

[21] Appl. No.: 759,825

[22] Filed: Jul. 29, 1985

[51] Int. Cl.⁴ .............................................. A01K 25/00
[52] U.S. Cl. .................................................. 119/130
[58] Field of Search ................................ 119/130, 133

[56] References Cited
U.S. PATENT DOCUMENTS

| | | | |
|---|---|---|---|
| 67,016 | 7/1867 | Belmer et al. | 119/133 |
| 1,179,149 | 4/1916 | Weikert | 119/133 |
| 1,474,231 | 11/1923 | Brown | 119/130 |
| 1,474,303 | 11/1923 | Veres | 119/130 |
| 1,592,137 | 7/1926 | East | 119/130 |

Primary Examiner—Hugh R. Chamblee
Attorney, Agent, or Firm—Charmasson & Holz

[57] ABSTRACT

An adjustable muzzle for training, restraining and treating animals, particularly canines; which muzzle can be easily, quickly, securely and adjustably applied to, and removed from, the head and nose of the animal.

5 Claims, 2 Drawing Figures

ADJUSTABLE MUZZLE

FIELD OF THE INVENTION

The invention relates to animal training, treatment and restraint devices and more specifically to dogs.

DESCRIPTION OF PRIOR ART

Various straps and halters exist for restraining animals. For example U.S. Pat. No. 660,494, Evans describes an adjustable halter to securely hold an animal. Another approach is described in U.S. Pat. No. 4,483,275, DeGroot which describes a halter that replaces the collar and the leash.

The principal disadvantage of such existing devices is that it is cumbersome and difficult for the trainer or veterinarian to apply to or remove the device from the head and nose of the animal. Furthermore, once it is applied, the device is not readily adjustable, and could be easily pawed off by the animal.

There is much need for a device which could be easily, quickly, securely, and adjustably applied to, and removed from, the head and snout of the animal.

SUMMARY OF THE INVENTION

The above-stated need is provided for by the instant invention, whose primary object is to enable the trainer or veterinarian to adjust, apply and remove the muzzle easily and quickly.

A further object of the invention is to secure the application of the muzzle to the head and nose of the animal, whereby it is not easily pawed off.

Another object of the invention is to use it as a substitute for the conventional collar and leash.

DESCRIPTION OF THE PREFERRED EMBODIMENT

Figure 1:
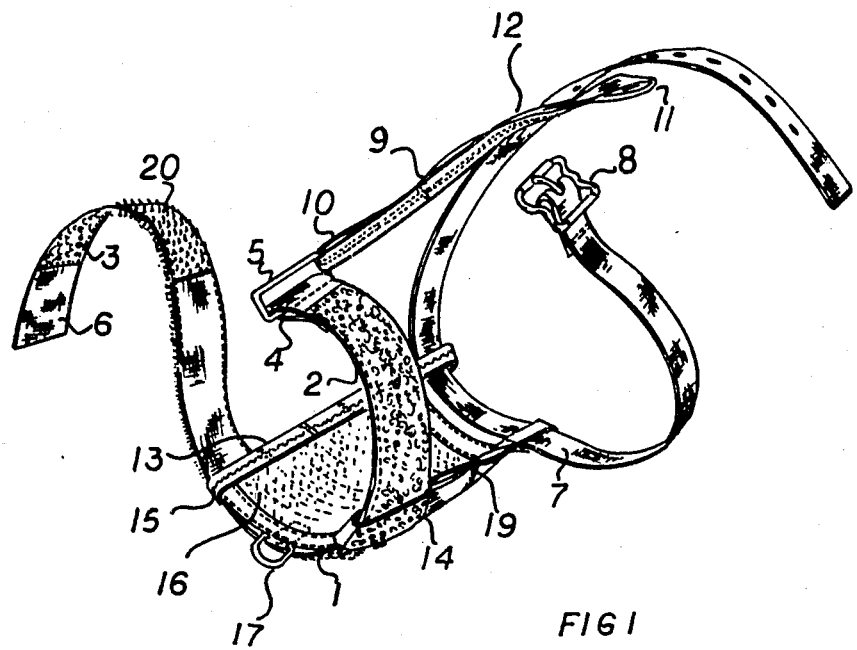
FIG. 1 is a perspective view of the preferred embodiment of the invention.
Figure 2:
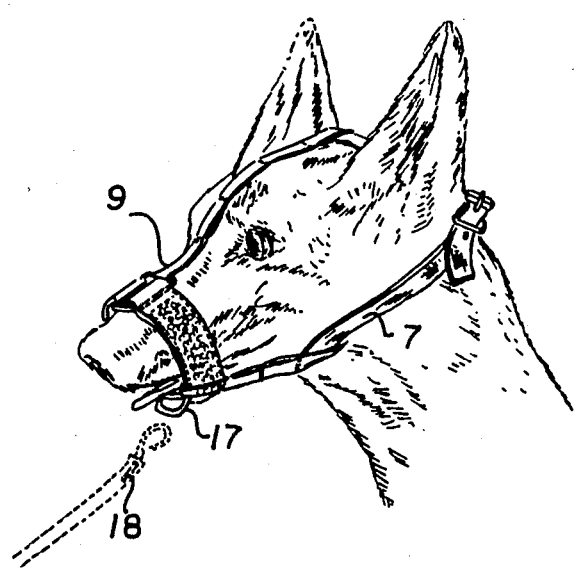
FIG. 2 illustrates the muzzle of FIG. 1 as applied to a canine.

FIGS. 1 and 2 illustrate the preferred embodiment of the muzzle. This embodiment comprises an adjustable loop member 1 for encircling the dog's muzzle, to which a loop patch 2 and a hook patch 3 of a releasable fastener such as Velcro R brand, are sewn successively on the outer side of this loop member 1. A hook patch 20 of the releasable fastening material is sewn on part of the inner side of the loop member 1, close to the end 6.

One end 4 of said loop member 1 passes through a slip ring 5, loops backward and is affixed to the body of loop member 1. The other end 6 of said loop member 1 passes through the slip ring 5, and loops backward. The loop patch 2 then fastens to this hook patch 3 at adjustable lengths. Such an arrangement strengthens the loop member 1 and decreases the possibility of it being pawed off by the dog. The hook patch 20 could alternatively be fastened to the loop patch 2 at adjustable lengths, such that the hook patch 20 does not touch the pelt of the dog.

An ajustable collar member 7 encircles the dog's neck behind its ears. The illustrated adjustment means comprises a buckle 8. Another embodiment of the adjustment means would be one similar to that for the loop member 1, as described above.

An adjustable nose bridge 9 attaches at one end 10 to the slip ring 5 and at the other end 11 to the collar member 7. The nose bridge comprises several loops 12 along its length. The collar member 7 passes through one of these successive loops 12, so as to increase or shorten the length of the nose bridge 9, according to the distance between the dog's nose and the back of its neck.

A pair of adjustable lateral supports 13, the front ends 14 of each comprises a loop 15, which houses the loop member 1. Each loop 15 should be equidistant to the slip ring 5. Each lateral support 13 comprises several successive loops 19 along its length. The collar member 7 passes through one loop 19 of each support 13 so as to increase or shorten the lengths of the supports 13, to fit the chin size of the dog.

The lateral supports 13 are connected by means of a rectangular membrane or web 16, whose utility is to stabilize the supports 13 in their lateral position, and to prevent the muzzle from being pawed off by the dog.

The membrane 16 comprises a "D" ring 17 which could be optionally connected to a leash 18 for training purposes.

While the preferred embodiment of the invention has been described, other embodiments may be devised within the spirit of the invention and the scope of the appended claims.

What is claimed is:

1. A muzzle for dogs comprising:
    a loop member for encircling the dog's snout having an adjustable means for securing said loop member around the snout;
    a collar member for encircling the dog's neck, having an adjustable means for securing said member around the neck;
    a nose bridge having means for connecting its rear end and front end to said collar and loop members respectively, wherein said means for connecting rear end is adjustable along the length of said nose bridge;
    a pair of lateral supports, each having means for connecting its rear end and front end to said collar and loop members respectively, wherein said means for connecting the rear end is adjustable along the length of said lateral supports, and said means for connecting the front end is adjustable along the length of the loop member; and
    a web connecting said lateral supports and supporting the chin of the dog.

2. A muzzle according to claim 1, wherein the adjustable means for securing said loop member around the snout comprises a slip ring, one end of said loop member passes through the slip ring and attaches to the said loop member, the front end of said nose bridge also passes through the slip ring.

3. A muzzle according to claim 2 wherein said adjustable means for connecting the rear end of nose bridge to the collar member comprises two or more successive loops along the length of said nose bridge, and the collar member passes through one of said loops depending upon the distance between the dog's nose and neck.

4. A muzzle according to claim 3 wherein said adjustable means for connecting the rear end of each lateral support comprises two or more successive loops along the length of said lateral support, and said collar member passes through one of said loops depending on the size of the dog's chin.

5. A muzzle according to claim 4 wherein said web connecting the lateral supports comprises a rectangular membrane and a "D" ring mounted on the forward edge of samd membrane for attachment to a leash.

* * * * *